(12) United States Patent
Bogue et al.

(10) Patent No.: US 10,927,684 B2
(45) Date of Patent: Feb. 23, 2021

(54) REPAIRING A COATING WITH A PRE-CONFIGURED COATING PATCH

(71) Applicant: United Technologies Corporation, Hartford, CT (US)

(72) Inventors: William Bogue, Hebron, CT (US); Dorel M. Moisei, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1090 days.

(21) Appl. No.: 15/018,313

(22) Filed: Feb. 8, 2016

(65) Prior Publication Data

US 2017/0226873 A1 Aug. 10, 2017

(51) Int. Cl.
| | |
|---|---|
| *B29C 73/10* | (2006.01) |
| *F01D 5/28* | (2006.01) |
| *C23C 28/00* | (2006.01) |
| *F01D 5/00* | (2006.01) |

(Continued)

(52) U.S. Cl.
CPC .............. *F01D 5/288* (2013.01); *B29C 65/48* (2013.01); *B29C 73/10* (2013.01); *C23C 28/3215* (2013.01); *C23C 28/3455* (2013.01); *F01D 5/005* (2013.01); *B29L 2031/3076* (2013.01); *F05D 2300/611* (2013.01); *Y02T 50/60* (2013.01)

(58) Field of Classification Search
CPC ... F01D 5/288; B29C 65/48; B29L 2031/3076
See application file for complete search history.

(56) References Cited

U.S. PATENT DOCUMENTS

| | | | | |
|---|---|---|---|---|
| 1,719,554 A | * | 7/1929 | Laugel | C03C 17/06 451/442 |
| 2,713,210 A | * | 7/1955 | Lobachewski | B64F 5/40 29/402.09 |
| 6,238,187 B1 | | 5/2001 | Dulaney et al. | |

(Continued)

FOREIGN PATENT DOCUMENTS

| | | | | |
|---|---|---|---|---|
| EP | 1591549 | 11/2005 | | |
| EP | 1881154 | 1/2008 | | |
| WO | WO-2014143224 A1 | * | 9/2014 | F01D 5/005 |

OTHER PUBLICATIONS

Extended EP Search Report dated May 22, 2017.

*Primary Examiner* — Jeffry H Aftergut
*Assistant Examiner* — Jaeyun Lee
(74) *Attorney, Agent, or Firm* — Getz Balich LLC

(57) ABSTRACT

A method is provided for repairing a component of an item of rotational equipment, where the component includes a coating and a component body, and where the coating is on the component body and includes a defect. The method includes steps of: (a) removing a portion of the coating from the component body thereby forming a coating aperture, the removed portion of the coating including the defect, and the portion of the coating is removed such that the coating aperture has a coating aperture configuration which substantially matches a first patch configuration of a first coating patch; (b) preparing the component at the coating aperture to receive the first coating patch, (c) disposing the first coating patch within the coating aperture; and (d) attaching the first coating patch to the component body.

20 Claims, 8 Drawing Sheets

(51) Int. Cl.
*B29C 65/48* (2006.01)
*B29L 31/30* (2006.01)

(56) References Cited

U.S. PATENT DOCUMENTS

| | | |
|---|---|---|
| 6,302,625 B1 | 10/2001 | Carey et al. |
| 7,216,428 B2 | 5/2007 | Memmen et al. |
| 7,509,734 B2 | 3/2009 | Memmen et al. |
| 8,834,126 B2 | 9/2014 | Hansen et al. |
| 8,906,181 B2 | 12/2014 | Hansen, Sr. et al. |
| 9,028,969 B2 | 5/2015 | Schmidt |
| 9,133,714 B2 | 9/2015 | Vontell |
| 9,140,130 B2 | 9/2015 | Mironets et al. |
| 9,145,775 B2 | 9/2015 | Levine et al. |
| 2007/0063351 A1 | 3/2007 | Duda et al. |
| 2007/0231156 A1* | 10/2007 | Hong ............ B64F 5/40 416/241 R |
| 2011/0036482 A1* | 2/2011 | Stenbaek ........ B29C 73/10 156/98 |
| 2011/0132523 A1* | 6/2011 | Evens ............ G01N 33/00 156/94 |
| 2011/0177309 A1* | 7/2011 | Dan-Jumbo ...... B29C 73/10 428/212 |
| 2012/0111478 A1* | 5/2012 | Akdeniz ......... B29C 73/24 156/98 |
| 2013/0019473 A1* | 1/2013 | DeMichael ....... F01D 5/005 29/888.021 |
| 2014/0166473 A1* | 6/2014 | Lipkin .......... C23F 13/14 204/196.1 |
| 2014/0326389 A1* | 11/2014 | Blanchard ...... B29C 65/4875 156/64 |
| 2016/0017712 A1 | 1/2016 | Vontell, Sr. et al. |

\* cited by examiner

REPAIRING A COATING WITH A PRE-CONFIGURED COATING PATCH

BACKGROUND OF THE INVENTION

1. Technical Field

This disclosure relates generally to a coating and, more particularly, to repairing a coating or coatings on a component body.

2. Background Information

During operation of an aircraft, its turbofan gas turbine engine may ingest various debris such as dust, dirt, small stones, etc. during aircraft takeoff and landing as well as while taxiing at an airport. The impact of this debris against an airstream component, especially an airfoil such as a fan blade or guide vane may create one or more chips and/or other types of defects in a coating of that fan blade. Such a coating may provide erosion protection to the underlying coatings or substrates. If the defects are bigger than a predetermined size and/or are of a predetermined type, the fan blade may need to be repaired in order for the aircraft to resume normal operation. However, typical methods for repairing a coating of a component such as a fan blade are time, equipment and labor intensive. For example, repairing the fan blade may involve the disassembling the turbine engine to remove the fan blade. The coating of the fan blade may then be removed such that a new coating can be applied onto that fan blade. Finally, the fan blade is reassembled into the turbine engine and the turbine engine is reassembled before the aircraft can continue normal operation.

There is a need in the art for improved methods of repairing a coating or coatings on a coated component.

SUMMARY OF THE DISCLOSURE

According to an aspect of the present disclosure, a method is provided for repairing a component of an item of rotational equipment, where the component includes a coating and a component body, and where the coating is on the component body and includes a defect. The method includes steps of: (a) removing a portion of the coating from the component body thereby forming a coating aperture, the removed portion of the coating including the defect, and the portion of the coating is removed such that the coating aperture has a coating aperture configuration which substantially matches a first patch configuration of a first coating patch; (b) preparing the component at the coating aperture to receive the first coating patch, (c) disposing the first coating patch within the coating aperture; and (d) attaching the first coating patch to the component body.

According to another aspect of the present disclosure, a method is provided for repairing an airfoil of an item of rotational equipment, where the airfoil includes a coating and an airfoil body, and where the coating is on the airfoil body and includes a defect. The method includes steps of: (a) removing a portion of the coating from the airfoil body thereby forming a coating aperture, the removed portion of the coating including the defect, wherein the portion of the coating is removed such that the coating aperture has a geometry that substantially matches, in shape and size, a geometry of a first coating patch; (b) disposing the first coating patch within the coating aperture; and (c) attaching the first coating patch to the airfoil body.

According to another aspect of the present disclosure, a method is provided for repairing an airfoil of a gas turbine engine, where the airfoil includes a coating and an airfoil body, and where the coating is on the airfoil body and includes a defect. The method includes steps of: (a) selecting a first template from a group of available templates, wherein a first template aperture extends through the first template, the first template aperture has a first template aperture configuration, and the group of available templates also includes a second template having a second template aperture with a second template aperture configuration which is different than the first template aperture configuration; (b) selecting a first coating patch from a group of available coating patches, wherein first coating patch has a first patch configuration, and the group of available coating patches also includes a second coating patch with a second patch configuration which is different than the first patch configuration; (c) arranging the first template with the airfoil; (d) removing a portion of the coating from the airfoil body using the first template thereby forming a coating aperture, the removed portion of the coating including the defect, wherein the portion of the coating is removed such that the coating aperture has a configuration that substantially matches the first patch configuration; (e) disposing the first coating patch within the coating aperture; and (f) attaching the first coating patch to the airfoil body. The first coating patch or the first template is selected based on a configuration of the defect in the coating. The airfoil is assembled with the gas turbine engine while the portion of the coating is removed from the airfoil body and while the first coating patch is attached to the airfoil body.

The portion of the coating may be removed such that the coating aperture has a shape and a size which is exactly or substantially the same as a shape and a size of the first coating patch. The patch may also be pre-fabricated before performance of this method to have its size and its shape.

The item of rotational equipment may be a gas turbine engine.

The component may be configured with the gas turbine engine during the removing, the disposing and the attaching. The gas turbine engine may also be configured on wing with an aircraft.

The component may be configured as or include a fan blade for the gas turbine engine.

The component may be configured as or include a guide vane for the gas turbine engine.

The coating may be an outer coating. An intermediate coating may be disposed between the outer coating and the component body. The first coating patch may be disposed onto the intermediate coating.

The first coating patch may be disposed directly onto the component body.

The method may also include a step of arranging a first template with the component. A first template aperture may extend through the first template. The first template aperture may have a first template aperture configuration which substantially matches the patch configuration. The removing may include removing the portion of the coating from the component body using the first template.

The removing may include abrasive wiping or media blasting the portion of the coating through the first template aperture.

The method may also include a step of selecting the first template from a group of available templates. A second template included in the group of available templates may have a second template aperture with a second template aperture configuration which is different than the first template aperture configuration. The first template may be selected based on a configuration of the defect.

The method may also include a step of selecting the first coating patch from a group of available coating patches. A second coating patch included in the group of available coating patches may have a second patch configuration which is different than the first patch configuration. The first coating patch may be selected based on the selection of the first template.

The method may also include steps of: selecting the first coating patch from a group of available coating patches, wherein the first coating patch is selected based on a configuration of the defect; and selecting the first template from a group of available templates, wherein the first template is selected based on the selection of the first coating patch. A second coating patch included in the group of available coating patches may have a second patch configuration which is different than the first patch configuration. A second template included in the group of available templates may have a second template aperture with a second template aperture configuration which is different than the first template aperture configuration.

The first coating patch may be configured as a sticker.

The method may also include a step of applying an adhesive to the first coating patch. The adhesive may attach the first coating patch to the component body, or to an intermediate coating. The adhesive may use an adhesion promoter, primer, or cure accelerator.

The first coating patch may have a thickness which is less than a thickness of the removed portion of the coating.

The method may also include a step of sealing a joint between the coating and the first coating patch with a sealing compound.

The coating may include a first polymer material. The first coating patch may include a second polymer material. This second polymer material may be the same as or different than the first polymer material.

The first coating patch may include polymer and the component body may include metal.

The foregoing features and the operation of the invention will become more apparent in light of the following description and the accompanying drawings.

DETAILED DESCRIPTION OF THE INVENTION

Methods and apparatuses are provided for repairing a coated component and, more particularly, a coating or coatings of the component. This component may be configured for an item of rotational equipment. The component, for example, may be configured as or include an airfoil. Examples of such a component include, but are not limited to, a fan blade, a guide vane and a propeller. The component of the present disclosure, however, is not limited to the foregoing exemplary component configurations.

The item of rotational equipment may be a gas turbine engine. The gas turbine engine may be configured in an aircraft propulsion system. Alternatively, the gas turbine engine may be configured in an auxiliary power unit for the aircraft. The methods and apparatuses of the present disclosure, however, are not limited to such aircraft applications. In other embodiments, for example, the gas turbine engine may be configured as an industrial gas turbine engine in a power generation system. In still other embodiments, the item of rotational equipment may alternatively be configured as a wind turbine, a water turbine or any other item of rotational equipment which includes a coated component capable of being repaired as described below.

Figure 1:
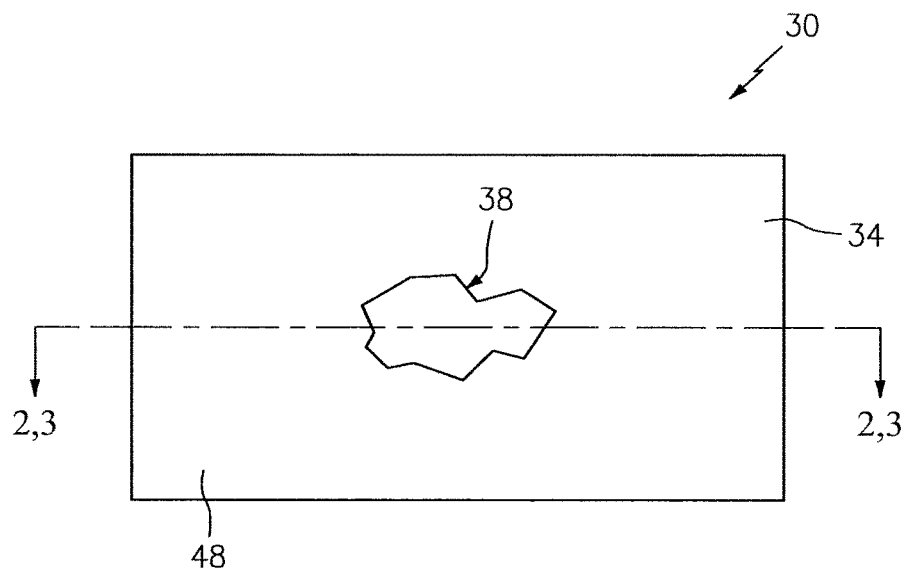
FIG. 1 is a top view block diagram illustration of a coated component with a defect.
Figure 2:
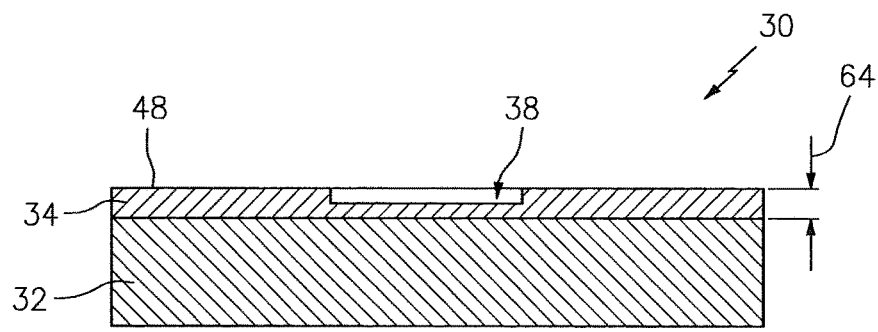
FIG. 2 is a sectional block diagram illustration of an embodiment of the coated component of FIG. 1.

FIGS. 1 and 2 are block diagram illustrations of a coated component 30 as described above. This coated component 30 includes a component body 32 (e.g., an airfoil body) and at least one coating 34.

The component body 32 of FIGS. 1 and 2 is configured as a base/base material of the component 30, and provides the component 30 with its structure and general geometry. The component body 32 may be constructed from metal. Examples of such metal include, but are not limited to, aluminum, titanium or an alloy of one or more of the foregoing materials. Alternatively, the component body 32 may be constructed from a composite material. Examples of such a composite material include, but are not limited to, a resin matrix including epoxy, bismaleimide, cyanate ester, or phenolic plus reinforcement including one or more of carbon fiber composite, a fiber glass composite, an aramid fiber composite and/or a ceramic fiber. The component body 32 of the present disclosure, however, is not limited to the foregoing exemplary component body materials or material types.

The coating 34 is configured to provide a protective layer/barrier between the component body 32 and its surrounding environment. The coating 34, for example, may be an environmental coating such as an erosion coating. The coating 34 may be constructed from a thin layer of coating material. This coating material may be a polymer material such as, but not limited to, polyurethane, fluorocarbon, fluorosilicone or silicone. The coating 34 of the present disclosure, however, is not limited to the foregoing exemplary coating materials, material types or coating types.

Figure 3:
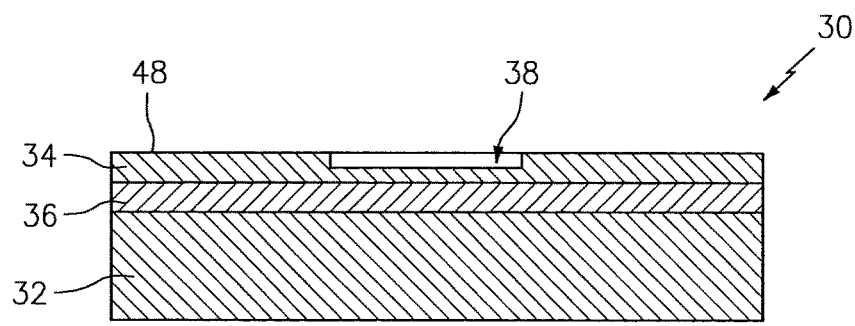
FIG. 3 is a sectional block diagram illustration of another embodiment of the coated component of FIG. 1.

The coating 34 of FIG. 2 is disposed directly on the component body 32. However, in other embodiments as illustrated in FIG. 3, the coating 34 may be an outer coating and disposed indirectly on the component body 32. The coating 34 of FIG. 3, for example, is separated from the component body 32 by at least one intermediate coating 36. The intermediate coating 36 may be constructed from a different material than that of the coating 34 material and may provide similar or different function than the coating 34. The intermediate coating 36, for example, may be a primer coating to facilitate the adherence of the original coating 34 to the component body 32 or a corrosion inhibiting primer coating to provide protection to the underlying component body 32.

Referring again to FIGS. 1 and 2, the coating 34 includes at least one defect 38. The term "defect" may describe a scratch, a chip, a nick, a dent and/or a dis-bounded portion in/of a coating or coatings. This defect 38 may extend partially into the coating 34, or completely through the coating 34 as illustrated in FIGS. 1 and 2. This defect 38 may also extend partially or completely through one or more underlying coatings (e.g., 36) between the coating 34 and the component body 32. Alternatively, the defect 38 may involve an entire thickness of the coating 34 (or coatings) where the defect 38 is a dis-bounded portion of that coating 34 (or coatings).

Figure 4:
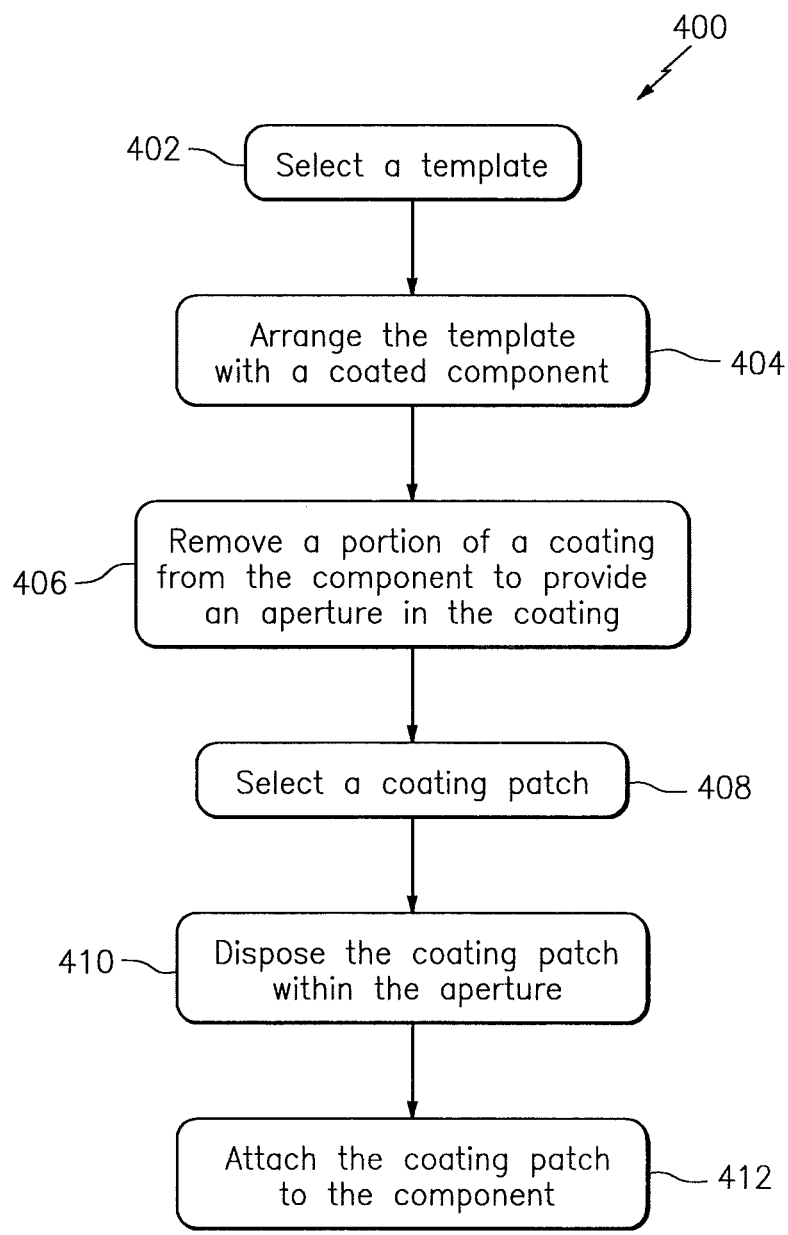
FIG. 4 is a flow diagram of a method for repairing a coated component with a defect.

FIG. 4 is a flow diagram of a method 400 for repairing a component such as, for example, the component 30 of FIGS. 1 and 2. While this method 400 is described below with reference to a single coating on a component body for ease of description, the method 400 may also be performed to repair a component with a plurality of coatings where a defect affects one or more or all of those coatings. For example, the method 400 may be performed on an outer coating where only that outer coating is affected by the defect. Alternatively, the method 400 may be performed on some or all of the (outer and intermediate) coatings where each of those coatings may be affected by the defect.

Figure 7:
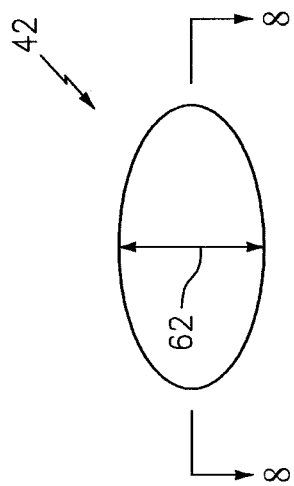
FIG. 7 is a top view block diagram illustration of a coating patch for repairing a coated component.
Figure 8:
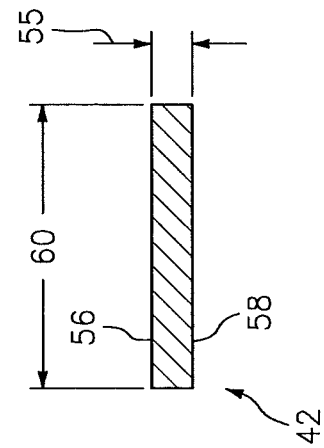
FIG. 8 is a sectional block diagram illustration of the coating patch of FIG. 8.
Figure 5:
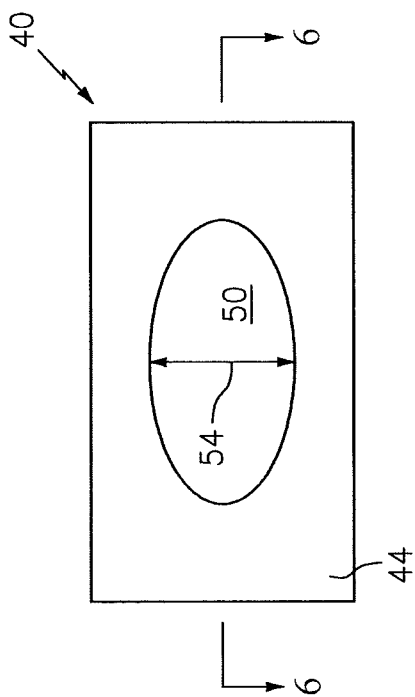
FIG. 5 is a top view block diagram illustration of a template for repairing a coated component.
Figure 6:
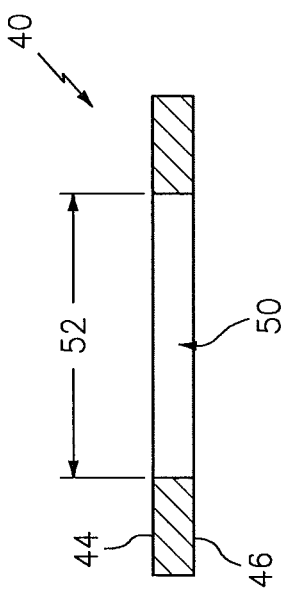
FIG. 6 is a sectional block diagram illustration of the template of FIG. 5.

In preparation to perform the method 400, one or more templates and one or more coating patches may be received or provided. An exemplary embodiment of a template 40 is illustrated in FIGS. 5 and 6. An exemplary embodiment of a coating patch 42 is illustrated in FIGS. 7 and 8.

The template 40 of FIGS. 5 and 6 has a body configured generally as a hard mask made from a plate or a block of material. The hard mask is configured to remain resistant to the abrasive removal process without transferring material to the component body 32 that is exposed during the coating 36 removal at the coating aperture. Examples of such a template body material include, but are not limited to, fiberglass composite, aluminum, titanium, and stainless steel. The template 40 has a thickness, which extends between opposing side surfaces 44 and 46 of the template body. The surface 46 may be shaped so as to specifically conform to an outer surface 48 of the component 30 (see FIGS. 12 and 13). Alternatively, the surface 46 may have a standardized geometry (e.g., a flat, planar geometry, an arcuate geometry, etc.) that generally conforms to the outer surface 48, or otherwise enables abutting the template 40 against the component 30 with the majority of the surfaces 46 and 48 in close proximity with one another.

Figure 9:
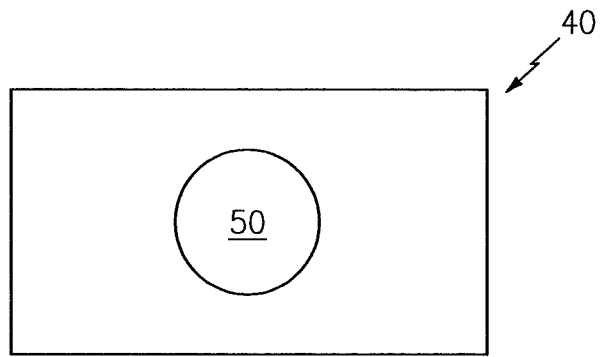
FIGS. 9-11 are top view block diagram illustrations of alternative template configurations for repairing a coated component.
Figure 10:
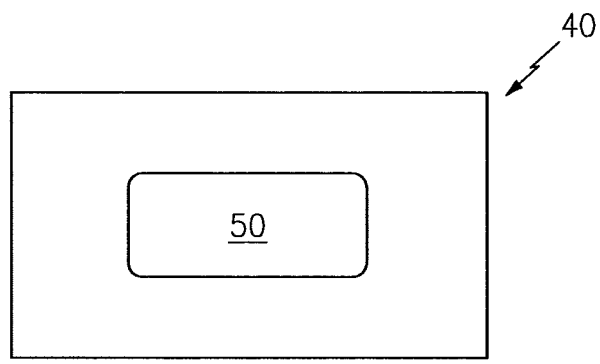
Figure 11:
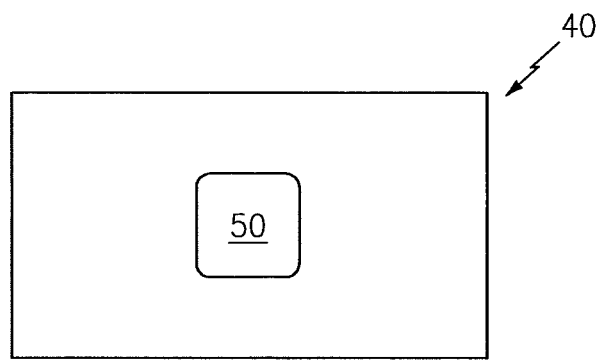

The template 40 includes a template aperture 50. This template aperture 50 extends along the thickness of the template 40 through the template body between the surfaces 44 and 46. In this manner, the template aperture 50 provides an open window or passage through the template 40 (see FIG. 12). The template aperture 50 of FIG. 5 has an elongated cross-sectional geometry (relative to the plane of the surface), such as an oval or elliptical cross-sectional geometry. The template 40 of the present disclosure, however, is not limited to such an exemplary cross-sectional geometry. For example, in other embodiments, the template aperture 50 may have a circular cross-sectional geometry (see FIG. 9), a rectangular cross-sectional geometry (see FIG. 10), a square cross-sectional geometry (see FIG. 11), a racetrack cross-sectional geometry, or any other polygonal and/or curved cross-sectional geometry.

In some embodiments, a group (e.g., set) of different templates 40 may be made available for performance of the method 400. The group of different templates 40 may include templates 40 having different template aperture 50 configurations; e.g., shapes and/or sizes. The templates 40, for example, may all have template apertures 50 with oval shapes but different major axis dimensions 52 (see FIG. 6) and/or minor axis dimensions 54 (see FIG. 5). Alternatively, at least one of the templates 40 may have template apertures 50 with a first shape whereas at least another one of the templates 40 may have template apertures 50 with a second shape, which is different from the first shape. The first shape, for example, may be an oval or rectangle and the second shape may be a circle or square.

The coating patch 42 of FIGS. 7 and 8 has a body configured generally as a sheet of material. Examples of such a patch body material include, but are not limited to, a polymer material such as polyurethane, fluorocarbon, fluorosilicone or silicone. This patch body material may be the same as or different from the coating 34 material. However, the patch body material in general should provide similar protective properties for the component body 32 as the coating 34 material.

The coating patch 42 has a thickness 55, which extends between opposing side surfaces 56 and 58 of the patch body. The coating patch 42 and its surfaces 56 and 58 have a configuration that is tailored to substantially match a configuration of a template aperture 50 for an associated template 40. The coating patch 42 of FIG. 7, for example, has an elongated cross-sectional geometry (relative to the plane of the surface), such as an oval or elliptical cross-sectional geometry. Thus, the coating patch 42 and the template aperture 50 of FIG. 5 have substantially the same shape. In addition, a major axis dimension 60 (see FIG. 8) and minor axis dimension 62 (see FIG. 7) of the coating patch 42 is sized to be substantially the same as (e.g., exactly the same as or slightly smaller than) the major axis dimension 52 and the minor axis dimension 54 of the template aperture 50 of FIG. 5.

Figure 18:
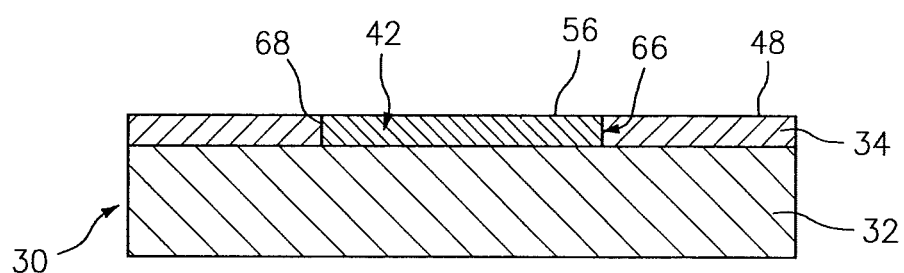
FIG. 18 is a sectional block diagram illustration of an embodiment of the repaired coated component of FIG. 17.
Figure 19:
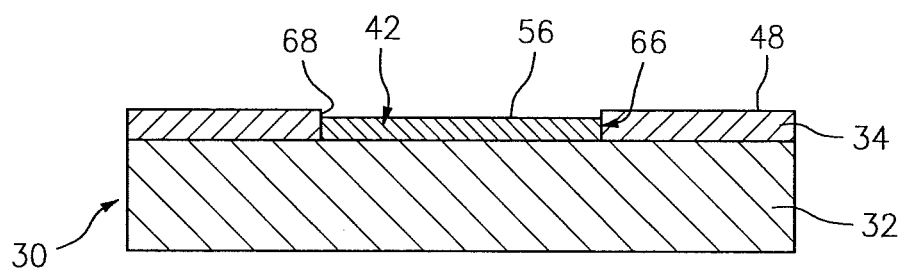
FIG. 19 is a sectional block diagram illustration of another embodiment of the repaired coated component of FIG. 17.

The thickness 55 of the coating patch 42 may be sized to be substantially equal to a thickness 64 of the coating 34 (see FIG. 2). In this manner, upon completion of the method 400, the surface 56 of the coating patch 42 may be substantially flush with the outer surface 48 of the component 30 as illustrated in FIG. 18. Alternatively, the thickness 64 of the coating patch 42 may be sized to be slightly less than the thickness 64 of the coating 34. In this manner, upon completion of the method 400, the surface 56 of the coating patch 42 may be slightly recessed inward from the outer surface 48 of the component 30 as illustrated in FIG. 19. Typically, however, the thickness 55 of the coating patch 42 should not be greater than the thickness 64 of the coating 34.

The coating patch 42 may be configured as a sticker. An adhesive material, for example, may be pre-applied to the patch body at its back surface 58 and covered by a protective removable sheet (not shown) until ready for use. More particularly, the sticker may be a fully cured film with a pre-disposed adhesive. The adhesive may be non-curable, uncured or partially cured as pre-disposed on the film. The pre-disposed adhesive may be covered with a non-stick backing layer to preserve the adhesive and facilitate fabrication of the first patch configuration and facilitate handling prior to disposing the patch to the coating aperture. An adhesive material may also or alternatively be applied to the patch body at its back surface 58 during the method 400 as discussed below in further detail. Examples of such adhesive materials include, but are not limited to, urethane, epoxy, butadiene rubber, cyanoacrylate, fluorocarbon or silicone.

In some embodiments, to further enhance bonding, an adhesion promotor to be applied to the component body to improve bond strength of the adhesive. In addition or alternatively, the cured film of the patch material may be plasma etched and/or chemically etched to promote improved adhesion of the adhesive to the film.

In some embodiments, a group (e.g., set) of different coating patches 42 is available for performance of the method 400. The group of different coating patches 42 may include coating patches 42 having different patch configurations; e.g., shapes and/or sizes. The coating patches 42, for example, may all have oval shapes but different major axis dimensions and/or minor axis dimensions. Alternatively, at least one of the coating patches 42 may have a first shape whereas at least another one of the coating patches 42 may have a second shape, which is different from the first shape. The first shape, for example, may be an oval or rectangle and the second shape may be a circle or square. However, as mentioned above, the configurations (e.g., shapes and dimensions) of the different coating patches 42 should correspond to the configurations of the template apertures 50 of the different templates 40.

In addition to the foregoing, the group of different coating patches 42 may also include patches of different thicknesses 55. In this manner, one of the coating patches 42 may be used for repairing a coating (or coatings) having a first thickness, and another one of the coating patches 42 may be used for repairing a coating (or coatings) having a second thickness, which is different from the first thickness. Furthermore, the group of coating patches 42 may also or alternatively include one or more duplicate coating patches 42; i.e., patches with the same configuration.

Figure 14A:
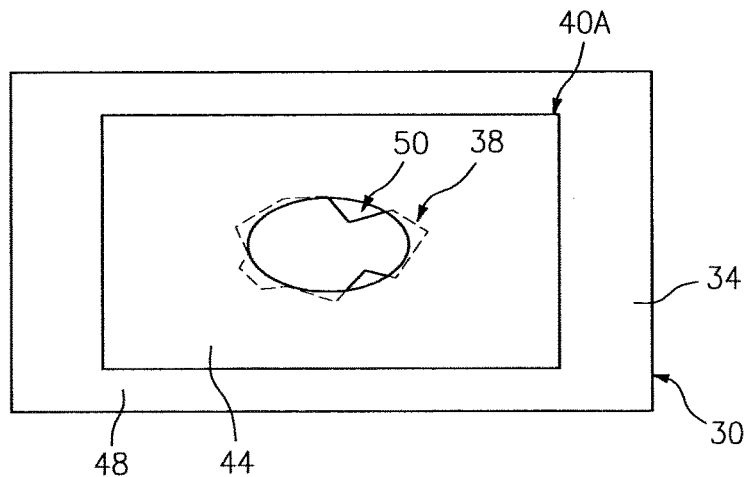
FIGS. 14A-C are top view block diagram illustrations of alternative template configurations on a coated component.
Figure 14B:
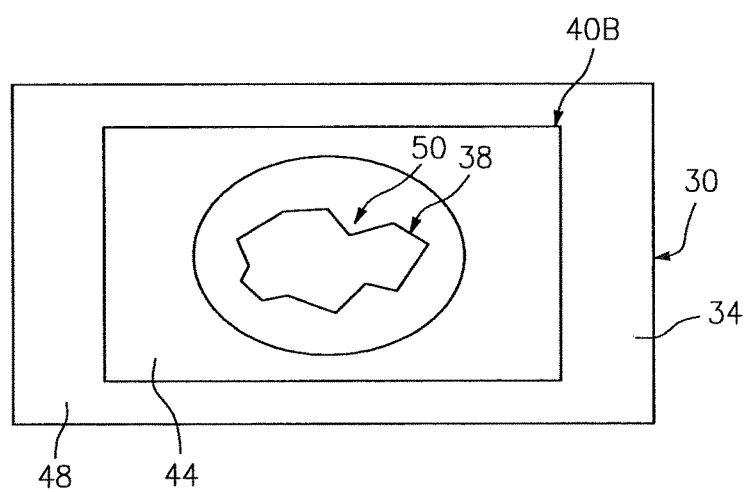
Figure 14C:
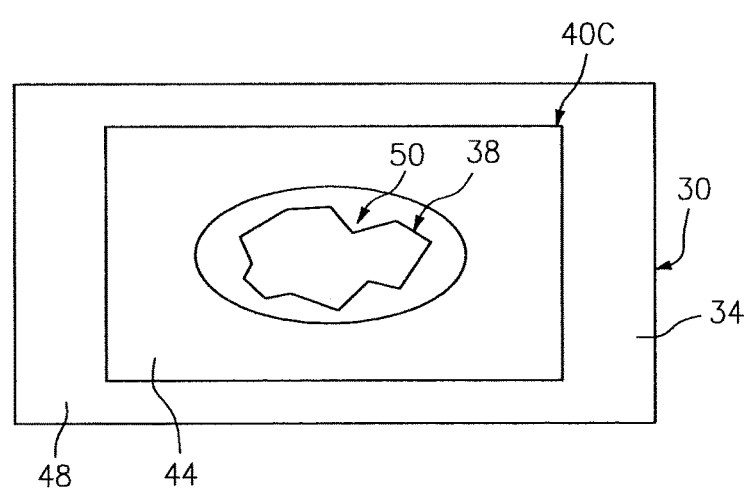

In step 402, one of the group of available templates 40 is selected based on the configuration of the defect 38 in the coating 34. FIGS. 14A-C respectively illustrates three different templates 40A-C situated against the coating 34. While the template 40A of FIG. 14A has an aperture geometry (e.g., shape) which generally matches a geometry (e.g., shape) of the defect 38, the periphery of the template aperture 50 does not completely circumscribe the defect 38. Thus, certain portions of the defect 38 are not visible through the template aperture 50; see dashed lines showing hidden portion of the defect 38. While the periphery of the template aperture 50 of the template 40B of FIG. 14B completely circumscribes the defect 38, the geometry of this template aperture 50 does not generally match that of the defect 38. Such a mismatch in the geometries may lead to the removal of more of the coating 34 than necessary in a subsequent step of this method 400. In contrast, the template 40C of FIG. 14C has an aperture geometry which generally matches a geometry of the defect 38. In addition, the periphery of the template aperture 50 of the template 40C of FIG. 14C completely circumscribes the defect 38. Thus, given the three template choices shown in FIGS. 14A-C, the template 40C of FIG. 14C would be selected in the step 402. The method 400 of the present disclosure, however, is not limited to the foregoing exemplary comparison and matching criteria; e.g., where the apertures 50 in all of the templates 40 have the same geometry.

Figure 12:
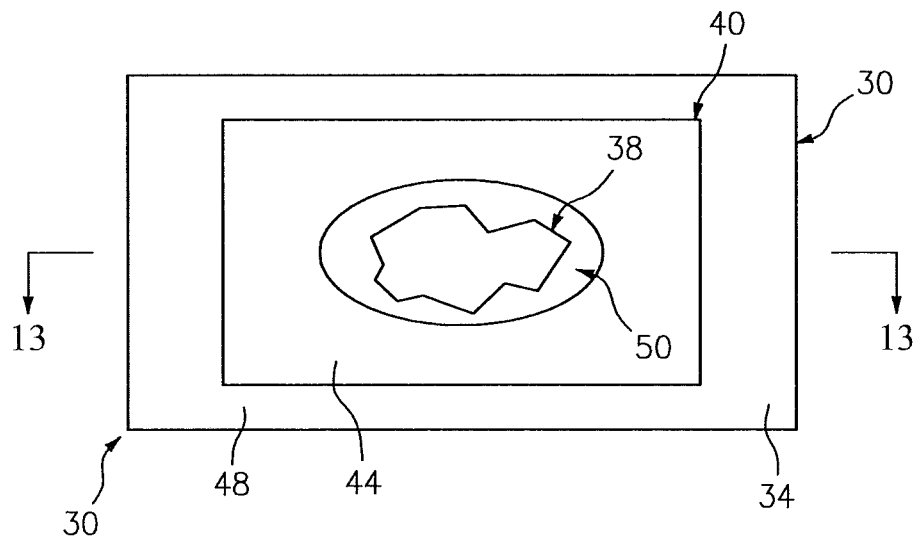
FIG. 12 is a top view block diagram illustration of a template on the coated component of FIG. 1.
Figure 13:
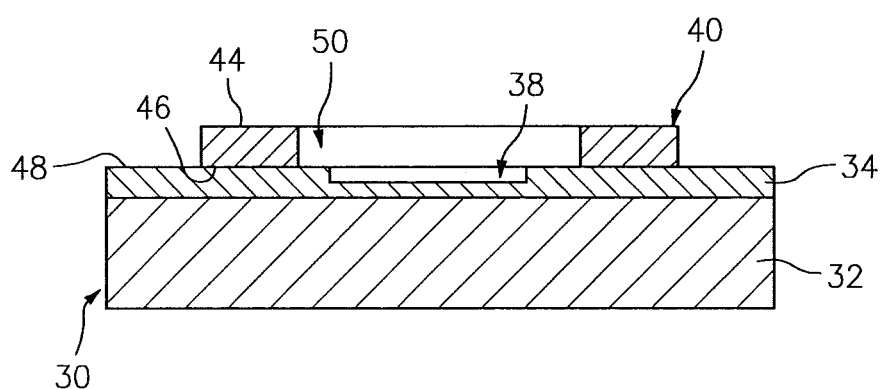
FIG. 13 is a sectional block diagram illustration of the template and the coated component of FIG. 12.

In step 404, the template 40 is arranged with the component 30 as shown in FIGS. 12 and 13. The surface 46 of the template 40, for example, is engaged with and abutted against the outer surface 48 of the component 30. The template 40 is positioned such that the defect 38 is visible through the template aperture 50; e.g., completely bounded by a periphery of the template aperture 50. Once in position, the template 40 may be held in place or temporarily attached to the component 30 using, for example, tape and/or any other suitable temporary attachment materials and/or devices.

Figure 15:
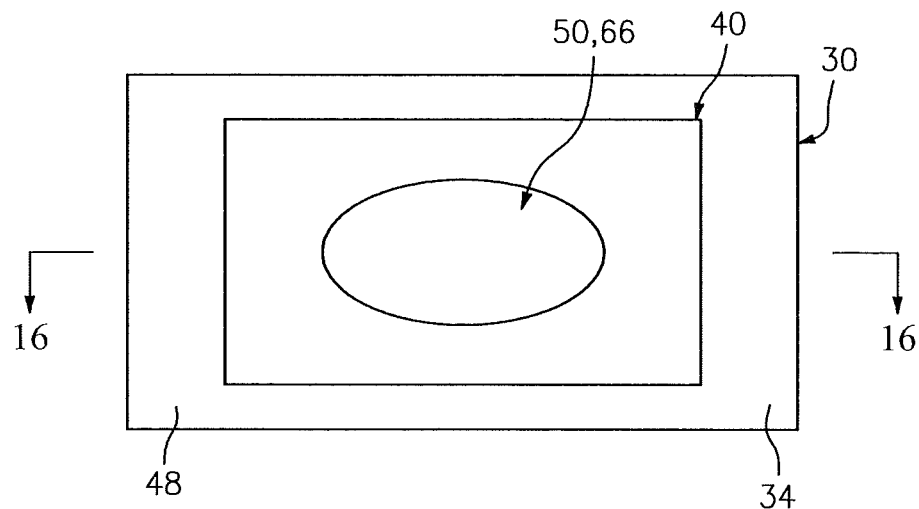
FIG. 15 is a top view block diagram illustration of the template and the coated component of FIG. 12 after a portion of its coating has been removed.
Figure 16:
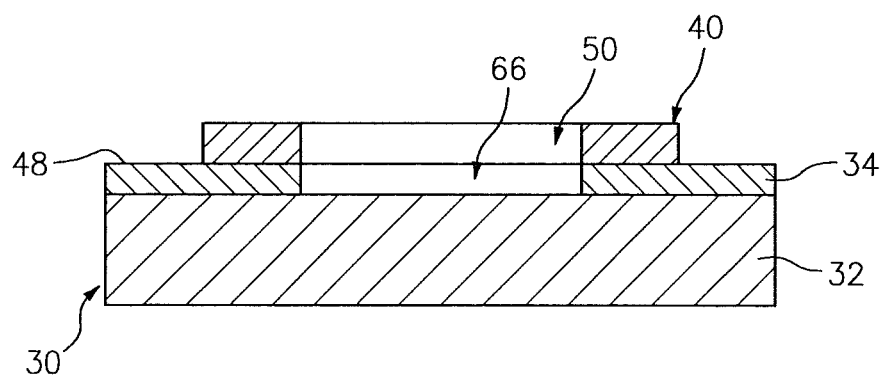
FIG. 16 is a sectional block diagram illustration of the template and the coated component of FIG. 15.

In step 406, a portion of the coating 34 is removed from the component body 32 using the template 40 as shown in FIGS. 15 and 16. This portion of the coating 34 includes the defect 38 (see FIGS. 12 and 13), which is visible through the template aperture 50, and may be removed by media blasting the coating 34 through the template aperture 50. Of course, the coating 34 may also or alternatively be removed using one or more other techniques such as, but not limited to, abrasive wiping, etc. By removing the portion of the coating 34, a coating aperture 66 is formed in the coating 34. This coating aperture 66 may extend completely through the coating 34 to the component body 32. The coating aperture 66 has a configuration (e.g., shape and dimensions) that is substantially identical to the configuration of the template aperture 50 and, thus, one of the grouping of available coating patches 42.

In step 408, one of the group of available coating patches 42 is selected based on the selection of the template 40 in the step 402. In particular, as described above, each of the templates 40 has a template aperture 50 matched with a coating patch 42. Thus, the coating patch 42 which has a configuration which matches the configuration of the template aperture 50 in the template selected in the step 402 is selected. However, in other embodiments, the coating patch 42 may be selected first and the template 40 may then be selected based on the selection of the coating patch 42.

Figure 17:
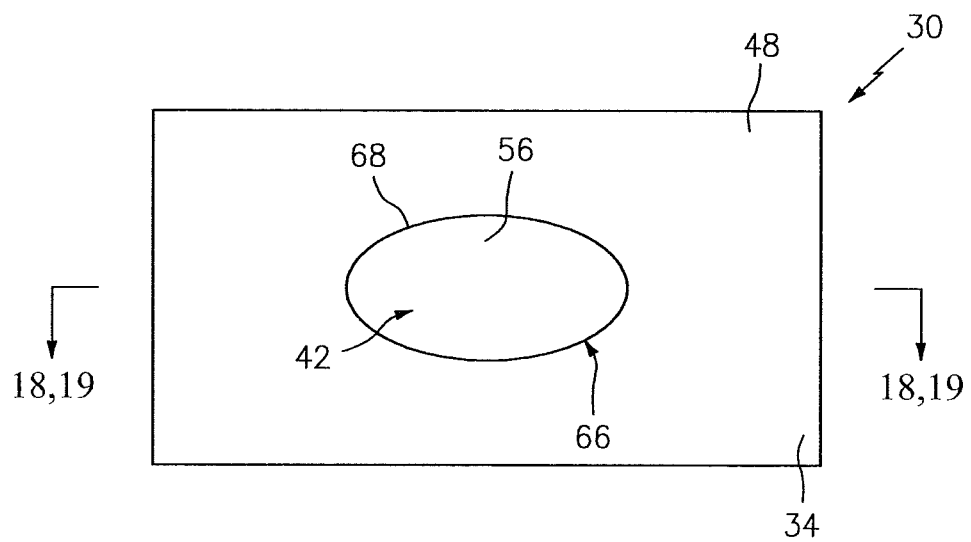
FIG. 17 is a top view block diagram illustration of a repaired coated component.

In step 410, the coating patch 42 is disposed within the coating aperture 66 as shown in FIGS. 17 and 18 (see also FIG. 19). In step 412, the coating patch 42 is attached (e.g., bonded) to the component body 32. For example, the protective removable sheet is removed from the back surface 58 of the coating patch 42 to expose the pre-applied adhesive before disposing the coating patch 42 in the coating aperture 66. Then, once the coating patch 42 is disposed within the coating aperture 66, the coating patch 42 can be pressed against the component body 32 such that the adhesive may form a bond between the coating patch 42 and the component body 32. To aid in this adhesion process, a certain amount of pressure and/or heat may be applied to the coating patch 42.

A joint 68 between the coating patch 42 and the surrounding coating 34 may be sealed in another step of the method 400. A sealing compound, for example, may be used to fill and/or smooth out any gaps and/or bumps at the joint 68 between the coating patch 42 and the surrounding coating 34. Examples of such a sealing compound include, but are not limited to, urethane, epoxy, cyanoacrylate, fluorocarbon, fluorosilicone, and silicone.

One or more of the foregoing method steps, of course, may be repeated if the component 30 includes multiple defects 38 in its coating 34.

In some embodiments, the method 400 may include additional method steps. For example, an adhesive may be applied to the back surface 58 of the coating patch 42 in addition to or as an alternative to the pre-applied "sticker" adhesive. In another example, the surface of the component body 32 (e.g., the surface forming a bottom periphery of the coating aperture 66) may be further worked or treated after removal of the coating portion, but before application of the coating patch 42. More particularly, the surface of the component body 32 may be wiped with a solvent such as acetone and/or abraded with an abrasive such as sandpaper.

In some embodiments, the method 400 may omit one or more of the foregoing method steps. For example, the sealing step may be omitted where the joint 68 is relatively tight and/or flush.

In some embodiments, the method 400 may be performed while the component 30 is assembled with an item of rotational equipment such as, for example, a gas turbine engine of an aircraft. For example, where the component 30 is a fan blade or a guide vane in a bypass duct of the gas turbine engine, a technician or technicians may perform the method 400 to patch the coating 34 without removing that component 30 from the engine; e.g., the engine may be "on wing". This may alleviate the need to send the aircraft to a hanger for component 30 repair and/or alleviate the need to remove the engine from the aircraft and/or disassemble the engine for component 30 repair. The method 400 therefore may reduce aircraft downtime and enable the aircraft to continue normal flight operation until a maintenance visit can be scheduled at a future date. Of course, in other embodiments, the method 400 may be performed where the component 30 has been removed from the gas turbine engine.

Example Patch Repair Kit

A patch repair kit may be assembly and provided to repair/maintenance technicians. Such a patch repair kit may include, but is not limited to, some or all of the following items:

- A grouping of templates 40. This grouping of templates may include a plurality of templates with circular template apertures of one or more of the following diameters: 0.25; 0.50; 0.75; 1.00; 1.25; 1.50; 1.75; 2.00; 2.25; 2.50; 2.75; and/or 3.00 inches. The grouping of templates may also or alternatively include a plurality of templates with race-track template apertures of a 0.5 inch minor-axis dimension and one or more of the following major-axis dimensions: 0.50; 0.75; 1.00; 1.25; 1.50; 1.75; 2.00; 2.25; 2.50; 2.75; and/or 3.00 inches. Of course, the grouping of templates may also or alternatively include templates with different aperture configurations than those described above.
- A grouping of coating patches 42. This grouping of coating templates may include at least one coating patch that corresponds to each of the templates included in the kit. In some kits, the grouping of coating patches may include one or more duplicates of one, some or all of the coating patches. In some kits, the grouping of coating patches may include coating patches of different thicknesses to accommodate repair of components with different coating thicknesses.
- A joint sealant compound.
- A solvent for cleaning the component body surface; e.g., acetone or any other suitable solvent. The solvent may be provided in a bottle. The solvent may also or alternatively be provided pre-applied to disposable wipes.
- A applicator such as a rubber pad on a hard support for applying pressure to the coating patch during the step 412.
- One or more sets of gloves.
- Directions describing how to perform one or more of the method steps above.
- A container for storing one or more of the afore-listed items.

As described above, the component 30 of the present disclosure may be configured with various different types and configurations of rotational equipment. One such type and configuration of the rotational equipment is a geared turbofan gas turbine engine. Such a turbine engine includes various stator structures (e.g., guide vanes, etc.) as well as various rotor structures (e.g., fan blades, etc.) as described below, where the component 30 can be configured as anyone of the foregoing structures in the turbine engine, or other structures not mentioned herein.

The turbine engine extends along an axial centerline between an upstream airflow inlet and a downstream airflow exhaust. The turbine engine includes a fan section, a compressor section, a combustor section and a turbine section. The compressor section includes a low pressure compressor (LPC) section and a high pressure compressor (HPC) section. The turbine section includes a high pressure turbine (HPT) section and a low pressure turbine (LPT) section.

The engine sections are arranged sequentially along the centerline within an engine housing, a portion or component of which may include or be connected to the component. This housing includes an inner case (e.g., a core case) and an outer case (e.g., a fan case). The inner case may house one or more of the engine sections; e.g., an engine core. The outer case may house at least the fan section.

Each of the engine sections includes a respective rotor. Each of these rotors includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor is connected to a gear train, for example, through a fan shaft. The gear train and the LPC rotor are connected to and driven by the LPT rotor through a low speed shaft. The HPC rotor is connected to and driven by the HPT rotor through a high speed shaft. The shafts are rotatably supported by a plurality of bearings. Each of these bearings is connected to the engine housing by at least one stationary structure such as, for example, an annular support strut.

During operation, air enters the turbine engine through the airflow inlet. This air is directed through the fan section and into a core gas path and a bypass gas path. The core gas path flows sequentially through the engine sections. The bypass gas path flows away from the fan section through a bypass duct, which circumscribes and bypasses the engine core. The air within the core gas path may be referred to as "core air". The air within the bypass gas path may be referred to as "bypass air".

The core air is compressed by the compressor rotors and directed into a combustion chamber of a combustor in the combustor section. Fuel is injected into the combustion chamber and mixed with the compressed core air to provide a fuel-air mixture. This fuel air mixture is ignited and combustion products thereof flow through and sequentially cause the turbine rotors to rotate. The rotation of the turbine rotors respectively drive rotation of the compressor rotors and, thus, compression of the air received from a core airflow inlet. The rotation of the turbine rotor also drives rotation of the fan rotor, which propels bypass air through and out of the bypass gas path. The propulsion of the bypass air may account for a majority of thrust generated by the turbine engine, e.g., more than seventy-five percent (75%) of engine thrust. The turbine engine of the present disclosure, however, is not limited to the foregoing exemplary thrust ratio.

The component 30 may be included in various aircraft and industrial turbine engines other than the one described above as well as in other types of rotational equipment; e.g., wind turbines, water turbines, rotary engines, etc. The component 30, for example, may be included in a geared turbine engine where a gear train connects one or more shafts to one or more rotors in a fan section, a compressor section and/or any other engine section. Alternatively, the component 30 may be included in a turbine engine configured without a gear train. The component 30 may be included in a geared or non-geared turbine engine configured with a single spool, with two spools, or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method for repairing a component of an item of rotational equipment, the component including a coating and a component body, and the coating on the component body and including a defect, the method comprising:
   arranging a first template with the component;
   removing a portion of the coating from the component body thereby forming a coating aperture, the removed portion of the coating including the defect, wherein the portion of the coating is removed such that the coating aperture has a coating aperture configuration which substantially matches a first patch configuration of a first coating patch, wherein a first template aperture extends through the first template, wherein the first template aperture has a first template aperture configuration which substantially matches the first patch configuration, wherein the removing comprises removing the portion of the coating from the component body using the first template, and wherein the removing comprises abrasive wiping or media blasting the portion of the coating through the first template aperture;
   preparing the component at the coating aperture to receive the first coating patch;
   disposing the first coating patch within the coating aperture; and
   attaching the first coating patch to the component body;
   wherein the first coating patch has a thickness which is less than a thickness of the removed portion of the coating, and wherein an entirety of an exterior surface of the first coating patch is recessed inward from an exterior surface of coating adjacent the coating patch.

2. The method of claim 1, wherein the portion of the coating is removed such that the coating aperture has a shape and a size which is the same as a shape and a size of the first coating patch, and the patch is pre-fabricated before performance of the method to have the size and the shape.

3. The method of claim 1, wherein the item of rotational equipment is a gas turbine engine.

4. The method of claim 3, wherein
   the component is configured with the gas turbine engine during the removing, the disposing and the attaching; and
   the gas turbine engine is configured on wing with an aircraft.

5. The method of claim 3, wherein the component comprises a fan blade for the gas turbine engine.

6. The method of claim 3, wherein the component comprises a guide vane for the gas turbine engine.

7. The method of claim 1, wherein
   the coating is an outer coating;
   an intermediate coating is disposed between the outer coating and the component body; and
   the first coating patch is disposed onto the intermediate coating.

8. The method of claim 1, wherein the first coating patch is disposed directly onto the component body.

9. The method of claim 1, further comprising:
   selecting the first template from a group of available templates;
   wherein a second template included in the group of available templates has a second template aperture with a second template aperture configuration which is different than the first template aperture configuration; and
   wherein the first template is selected based on a configuration of the defect.

10. The method of claim 9, further comprising:
    selecting the first coating patch from a group of available coating patches;
    wherein a second coating patch included in the group of available coating patches has a second patch configuration which is different than the first patch configuration; and
    wherein the first coating patch is selected based on the selection of the first template.

11. The method of claim 1, further comprising:
    selecting the first coating patch from a group of available coating patches, wherein the first coating patch is selected based on a configuration of the defect; and
    selecting the first template from a group of available templates, wherein the first template is selected based on the selection of the first coating patch;
    wherein a second coating patch included in the group of available coating patches has a second patch configuration which is different than the first patch configuration;
    wherein a second template included in the group of available templates has a second template aperture with a second template aperture configuration which is different than the first template aperture configuration.

12. The method of claim 1, wherein the first coating patch is configured as a sticker.

13. The method of claim 1, further comprising:
applying an adhesive to the first coating patch;
wherein the adhesive attaches the first coating patch to the component body.

14. The method of claim 1, further comprising sealing a joint between the coating and the first coating patch with a sealing compound.

15. The method of claim 1, wherein the coating comprises a first polymer material and the first coating patch comprises a second polymer material which is the same as the first polymer material.

16. A method for repairing an airfoil of an item of rotational equipment, the airfoil including a coating and an airfoil body, and the coating on the airfoil body and including a defect, the method comprising:
removing a portion of the coating from the airfoil body thereby forming a coating aperture by abrasive wiping or media blasting the portion of the coating through a first template aperture in a first template disposed next to the airfoil, the removed portion of the coating including the defect, wherein the portion of the coating is removed such that the coating aperture has a geometry that substantially matches, in shape and size, a geometry of a first coating patch;
disposing the first coating patch within the coating aperture; and
attaching the first coating patch to the airfoil body, wherein an entirety of an exterior surface of the first coating patch is recessed inward from an exterior surface of coating adjacent the coating patch.

17. The method of claim 1, wherein the component body comprises fiber composite material and the coating comprises polymer material.

18. The method of claim 1, wherein the first template comprises metal.

19. The method of claim 1, wherein the first template comprises fiberglass composite material.

20. A method for repairing a component of an item of rotational equipment, the component including a coating and a component body, and the coating on the component body and including a defect, the method comprising:
removing a portion of the coating from the component body thereby forming a coating aperture by abrasive wiping or media blasting the portion of the coating through a first template aperture in a first template disposed next to the component, the removed portion of the coating including the defect, wherein the portion of the coating is removed such that a configuration of the coating aperture substantially matches a configuration of a first coating patch;
disposing the first coating patch within the coating aperture; and
attaching the first coating patch to the component body, wherein an entirety of an exterior surface of the first coating patch is recessed inward from an exterior surface of coating adjacent the coating patch.

* * * * *